United States Patent
McIntosh et al.

(10) Patent No.: US 9,665,741 B1
(45) Date of Patent: *May 30, 2017

(54) UNIVERSAL EMERGENCY POWER-OFF SWITCH SECURITY DEVICE

(71) Applicant: INTERNATIONAL BUSINESS MACHINES CORPORATION, Armonk, NY (US)

(72) Inventors: Steven C McIntosh, Kingston, NY (US); John M. Skillman, New Paltz, NY (US); John G. Torok, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/384,371

(22) Filed: Dec. 20, 2016

Related U.S. Application Data

(63) Continuation of application No. 15/013,290, filed on Feb. 2, 2016.

(51) Int. Cl.
| | |
|---|---|
| *G06F 7/04* | (2006.01) |
| *G06F 21/86* | (2013.01) |
| *E06B 5/10* | (2006.01) |
| *G06F 21/81* | (2013.01) |
| *G06F 1/16* | (2006.01) |

(52) U.S. Cl.
CPC ............ *G06F 21/86* (2013.01); *E06B 5/10* (2013.01); *G06F 1/16* (2013.01); *G06F 21/81* (2013.01)

(58) Field of Classification Search
CPC ........... G06F 21/86; G06F 1/181; G06F 21/81
USPC ...................................................... 726/26
See application file for complete search history.

(56) References Cited

U.S. PATENT DOCUMENTS

| | | |
|---|---|---|
| 2,224,551 A | 12/1940 | Roeder |
| 2,438,094 A | 3/1948 | Petrullo |
| 2,771,521 A | 1/1956 | Cressman et al. |
| 3,059,069 A | 10/1962 | Sedley |
| 3,093,412 A | 6/1963 | Gore et al. |
| 3,257,517 A | 6/1966 | Sedley |
| 3,497,646 A | 2/1970 | Pollak |
| 3,560,673 A | 2/1971 | Schweizer et al. |
| 3,569,645 A | 3/1971 | Lea |
| 3,833,781 A | 9/1974 | Rumpf |

(Continued)

FOREIGN PATENT DOCUMENTS

| | | |
|---|---|---|
| CA | 47148 A | 2/1951 |
| CA | 547259 A | 10/1957 |

(Continued)

*Primary Examiner* — Mohammad W Reza
(74) *Attorney, Agent, or Firm* — Weitzman Law Offices, LLC

(57) ABSTRACT

A security device for a universal emergency power-off (UEPO) switch of a computer system enclosure involves a plate body having a first and second portion, the first portion has a length and width sufficient to allow it to be rigidly constrained, the second portion has: a hand grip near an end of the second portion including surface texturing sufficient to capture and retain epithelial cells from a person who grips the hand grip to gain access to the UEPO switch. The plate body also has a deformation region such that, when the first portion is rigidly constrained, application of a force, directed within a range from 0° to about 45° from a right angle to the surface, will cause plastic deformation of the plate body within the deformation region.

1 Claim, 4 Drawing Sheets

(56) References Cited

U.S. PATENT DOCUMENTS

| | | | |
|---|---|---|---|
| 3,852,692 A | 12/1974 | Moorman | |
| 3,906,176 A | 9/1975 | Carlson | |
| 3,918,459 A | 11/1975 | Horn | |
| 3,988,724 A | 10/1976 | Anderson | |
| 4,431,893 A | 2/1984 | Levie | |
| 4,538,142 A | 8/1985 | Hamilton et al. | |
| 4,601,011 A | 7/1986 | Grynberg | |
| 4,737,776 A | 4/1988 | Wireman | |
| 5,520,424 A | 5/1996 | Hapke et al. | |
| 5,771,002 A | 6/1998 | Creek et al. | |
| 5,938,472 A | 8/1999 | Yuen et al. | |
| 6,252,187 B1 | 6/2001 | Dannenberg | |
| 6,929,479 B2 | 8/2005 | Bellows et al. | |
| 7,825,793 B1 | 11/2010 | Spillman et al. | |
| 8,902,318 B1 | 12/2014 | Haddad et al. | |
| 8,902,570 B2 | 12/2014 | Cosley et al. | |
| 9,147,068 B1 | 9/2015 | Haddad et al. | |
| 2002/0021205 A1 | 2/2002 | Schweitzer | |
| 2002/0128769 A1 | 9/2002 | DerGhazarian et al. | |
| 2004/0011408 A1 | 1/2004 | Campbell | |
| 2004/0132559 A1 | 7/2004 | Bellows et al. | |
| 2007/0089433 A1 | 4/2007 | McDonnell et al. | |
| 2008/0224835 A1 | 9/2008 | Noest | |
| 2010/0288260 A1 | 11/2010 | Castelli et al. | |
| 2013/0343162 A1 | 12/2013 | Spychalski et al. | |
| 2014/0230885 A1 | 8/2014 | Fyson et al. | |
| 2015/0286817 A1 | 10/2015 | Haddad et al. | |
| 2015/0288882 A1 | 10/2015 | Haddad et al. | |

FOREIGN PATENT DOCUMENTS

| | | |
|---|---|---|
| CA | 845787 A | 6/1970 |
| CA | 396657 | 9/1976 |
| CA | 1019369 A1 | 10/1977 |
| CA | 1187141 A1 | 5/1985 |
| CA | 2225628 A1 | 6/1999 |
| CA | 2258378 A1 | 6/2000 |
| CA | 2625786 A1 | 9/2008 |
| CN | 2642864 | 9/2004 |
| CN | 2648990 | 11/2004 |
| CN | 10127884 A | 10/2008 |
| CN | 201191437 Y | 2/2009 |
| DE | 2402713 A1 | 8/1974 |
| DE | 3276776 D1 | 8/1987 |
| EP | 82311 A1 | 6/1983 |
| EP | 1525519 A1 | 4/2005 |
| EP | 1004159 B1 | 3/2008 |
| EP | 1526619 B1 | 1/2009 |
| FR | 1604689 | 1/1972 |
| FR | 2217237 A1 | 9/1974 |
| FR | 2217237 B3 | 11/1976 |
| GB | 1400177 A | 7/1975 |
| GB | 2114791 | 8/1983 |
| GB | 2263012 A | 10/1990 |
| GB | 2266799 A | 11/1993 |
| GB | 2384993 B | 5/2004 |
| JP | 49112217 A | 10/1974 |
| JP | 4741081 B2 | 5/2011 |
| WO | 9418649 A1 | 8/1994 |
| WO | 9623947 A1 | 8/1996 |
| WO | 9903180 A1 | 1/1999 |
| WO | 03019779 A1 | 3/2003 |
| WO | 2004008012 A1 | 5/2004 |
| WO | 2013041871 A2 | 3/2013 |
| WO | 2015157208 A1 | 10/2015 |

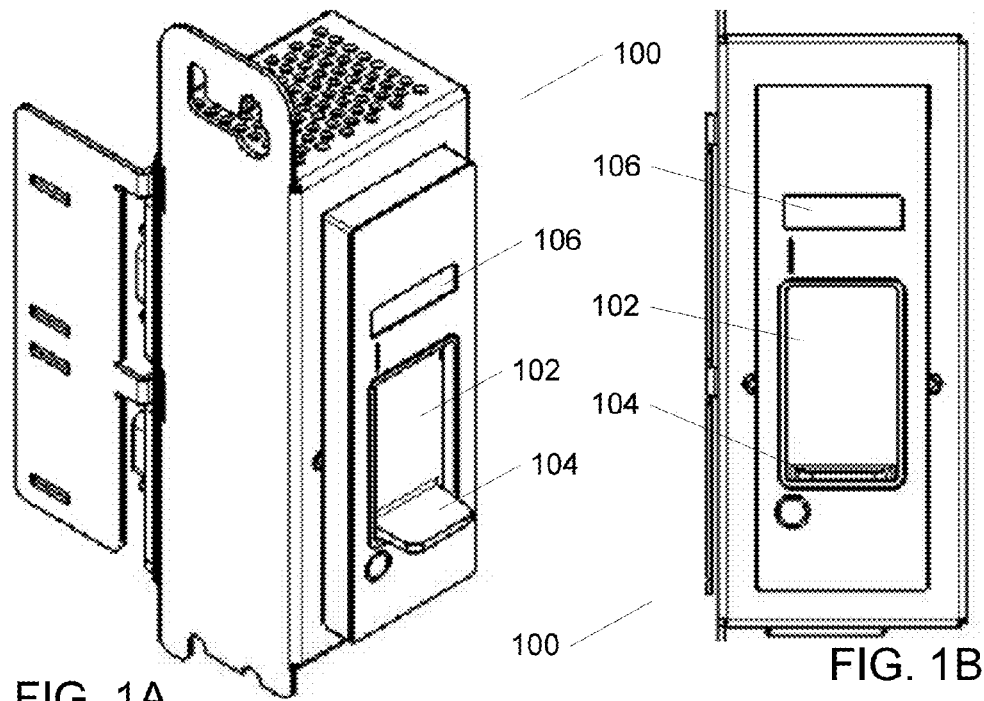
FIG. 1A (Prior Art)
FIG. 1B (Prior Art)
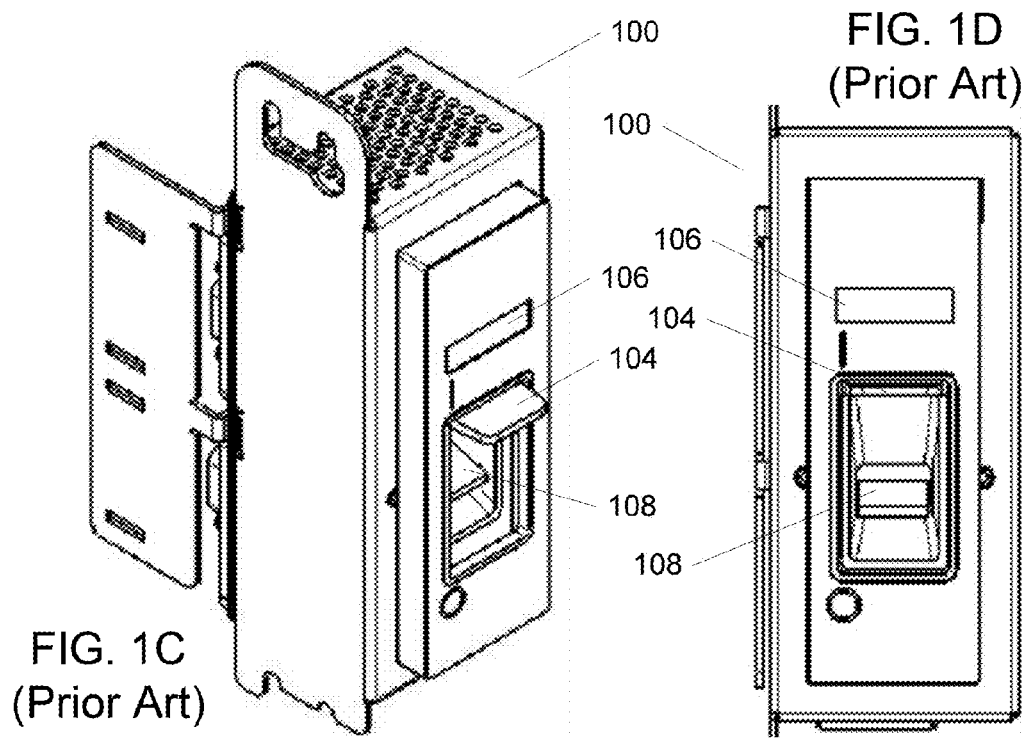
FIG. 1C (Prior Art)
FIG. 1D (Prior Art)

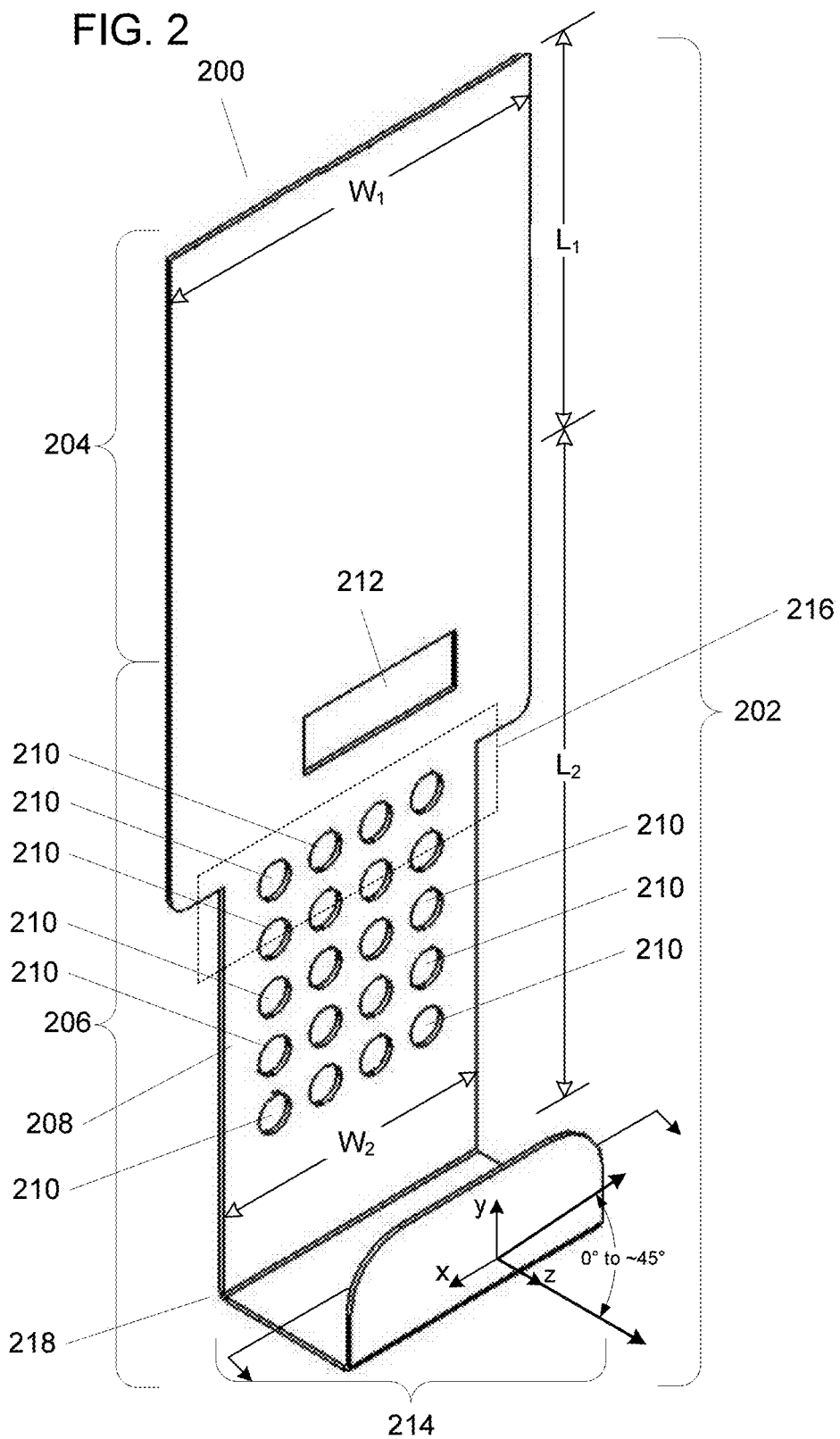

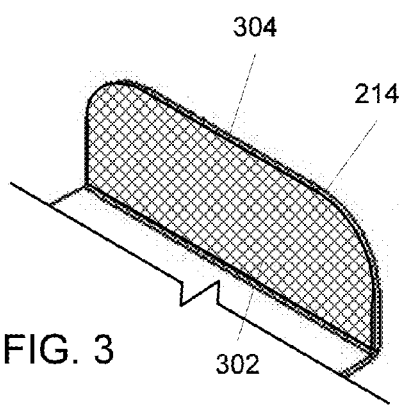
FIG. 3
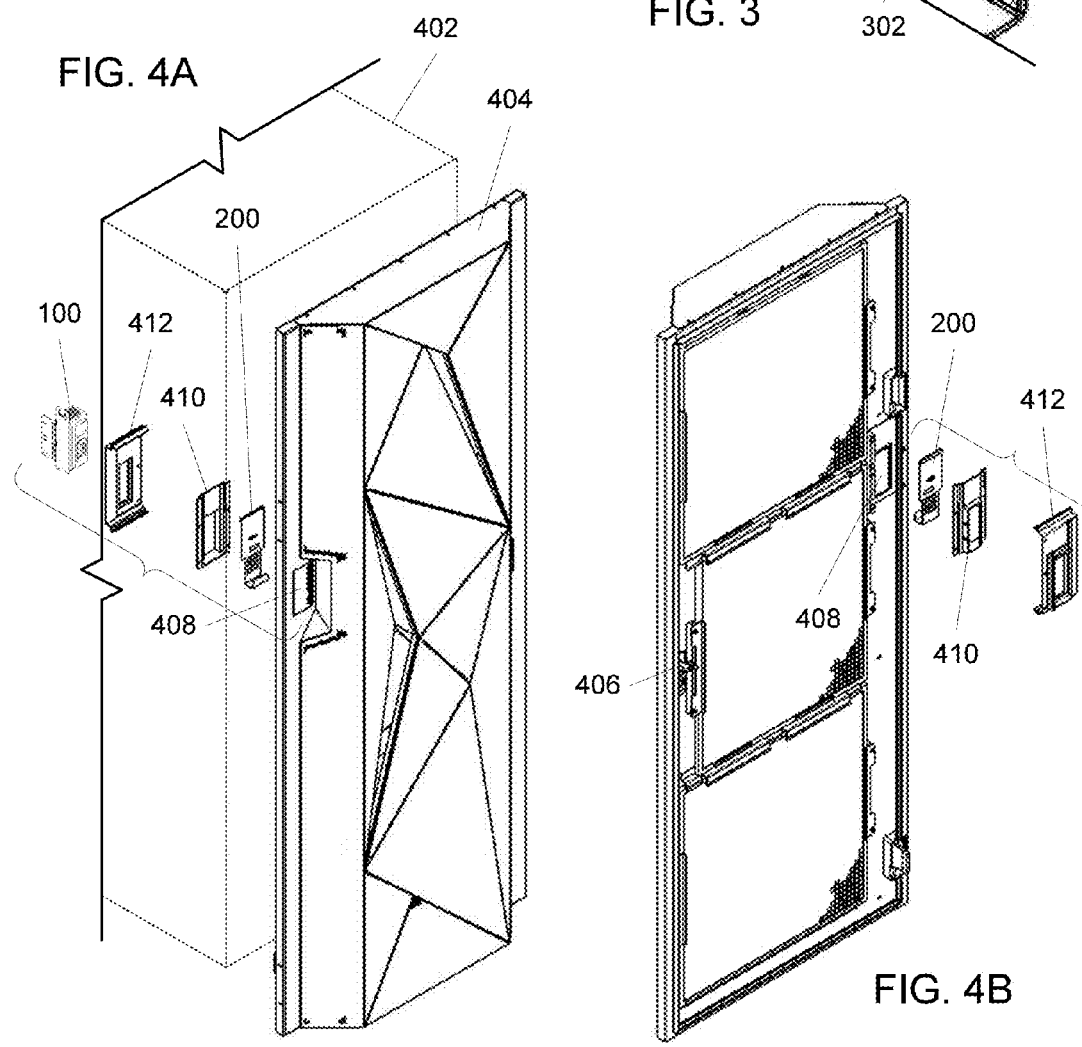
FIG. 4A
FIG. 4B

UNIVERSAL EMERGENCY POWER-OFF SWITCH SECURITY DEVICE

CROSS REFERENCE TO RELATED APPLICATIONS

This application is a continuation of U.S. patent application Ser. No. 15/013,290, filed Feb. 2, 2016, the entirety of which is incorporated herein by reference.

FIELD OF THE INVENTION

This disclosure relates generally to computer system hardware and, more particularly, computer security hardware.

BACKGROUND

Recent IT industry trends has seen a greater use of co-location datacenters to supplant/augment client IT computer infrastructure. This has resulted in an increase in the types of people who need access to areas containing such computers in order to provide on-site service support (i.e., a variety of suppliers, contractors, etc.). Consequently, the increased access has concurrently created a heightened need for system hardware security to minimizing potential tampering events. Some computer systems employ a locked door approach, whereby the emergency power off switch is maintained behind the locked door. However, this creates a problem because, in an emergency, such computer systems cannot be shut off using the switch unless/until, an appropriate person unlocks the door.

To avoid the foregoing problem, some computer systems leave the emergency power off switch and a tag or label containing certain system identification information exposed and accessible, irrespective of whether there is a door that can be locked to prevent access to the remainder of the computer equipment. However, computer systems with a universal emergency power off (UEPO) that is exposed when their enclosure is closed and locked are susceptible to the UEPO switch being switched when the system is running, either inadvertently, or intentionally.

To prevent inadvertent switching of the UEPO switch, many computer systems include a door or cover over the switch that must be slid or flipped out of the way in order to be able to move the UEPO switch. However, such an approach does noting to prevent intentional tampering with the switch.

Intentional tampering with an exposed UEPO switch (i.e., switching it off while the system is running) creates a significant problem because it would effectively interrupt system operation in the equivalent of an "unscheduled incident repair action" (UIRA). A UIRA is a hardware event that causes a system to be rebooted in full or degraded mode. It is typically caused by a non-recoverable failure in a critical hardware function which results in the need to bring a customer's system down for repair at an unscheduled time and is perhaps the single most important Reliability, Availability and Serviceability (RAS) characteristic.

Moreover, since that type of intentional tampering with the UEPO switch would be "transparent" in that it would normally appear to be a legitimate UIRA, it would likely be treated as such, resulting in a time consuming, wasteful, and fruitless search for the cause of the failure.

Thus, there is a continuing problem with maintaining the security of an exposed UEPO switch of a computer system against tampering while allowing for legitimate access in an emergency.

SUMMARY

One aspect of this disclosure involves a security device for a universal emergency power-off (UEPO) switch of a computer system enclosure having a door that can be locked and unlocked and provide access to computer equipment within the computer system enclosure. The door has an access opening therein, that provides access to the universal emergency power-off switch when the door is in a closed position.

The security device includes a plate body having a first portion and a second portion opposite the first portion. The first portion has a length and width sufficient to allow it to be rigidly constrained on an interior side of the door adjacent the access opening. The second portion has a hand grip near an end of the second portion opposite the first portion. The hand grip includes surface texturing sufficient to capture and retain epithelial cells from a person who grips the hand grip during the act of gaining access to the UEPO switch behind the second portion of the security device so that the captured epithelial cells will be available for testing or analysis to assist in identifying the person who accessed the UEPO switch.

The width of part of the second portion is less than a corresponding width of the access opening but sufficiently wide so as to impede access to the UEPO switch when the first portion is rigidly constrained on an interior side of the door and the door is in the closed position.

The plate body has a deformation region, of a thickness and material, such that, when the first portion is rigidly constrained on the interior side of the door adjacent the access opening, application of a force of less than about 45 Newtons to the hand grip, directed within a range from 0° to about 45° from a right angle to the surface in a direction of the first portion, will cause plastic deformation of the plate body within the deformation region.

Advantageously, the foregoing restricts access to the UEPO switch under normal circumstances, but allows for normal access to system identification information that is typically located near the UEPO switch, as well as direct access to the UEPO switch in an emergency when the door of the computer system enclosure is closed and locked. However, when such access occurs, either illicitly or in an emergency, the plate body will be plastically deformed and thereby evidence the occurrence. In addition, epithelial cells of the person who did so will be captured by the handle, facilitating identification of the person who accessed the switch through "contact trace DNA" (also referred to as "touch DNA" or "low-level DNA") analysis.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which:

FIG. 1A illustrates, in simplified form, a perspective view of a UEPO switch;

FIG. 1B illustrates, in simplified form, a front view of the example UEPO switch unit of FIG. 1A;

FIG. 1C illustrates, in simplified form, a perspective view of the example UEPO switch unit of FIG. 1A, with the cover opened;

FIG. 1D illustrates, in simplified form, a front view of the example UEPO switch unit of FIG. 1C;

FIG. 2 illustrates, in simplified form, one example of a security device for use with a UEPO switch according to the teachings herein;

FIG. 3 illustrates, in simplified form, a sectional perspective view of the hand grip portion of the security device of FIG. 2, viewed from the second portion of the plate body;

FIGS. 4A-4B respectively illustrate, in simplified form, a front and rear exploded perspective view of part of a computer system enclosure having a door with a lock, that can be locked and unlocked, and, when open, will provide access to computer equipment within the computer system enclosure;

DETAILED DESCRIPTION

Figures 5, 6:
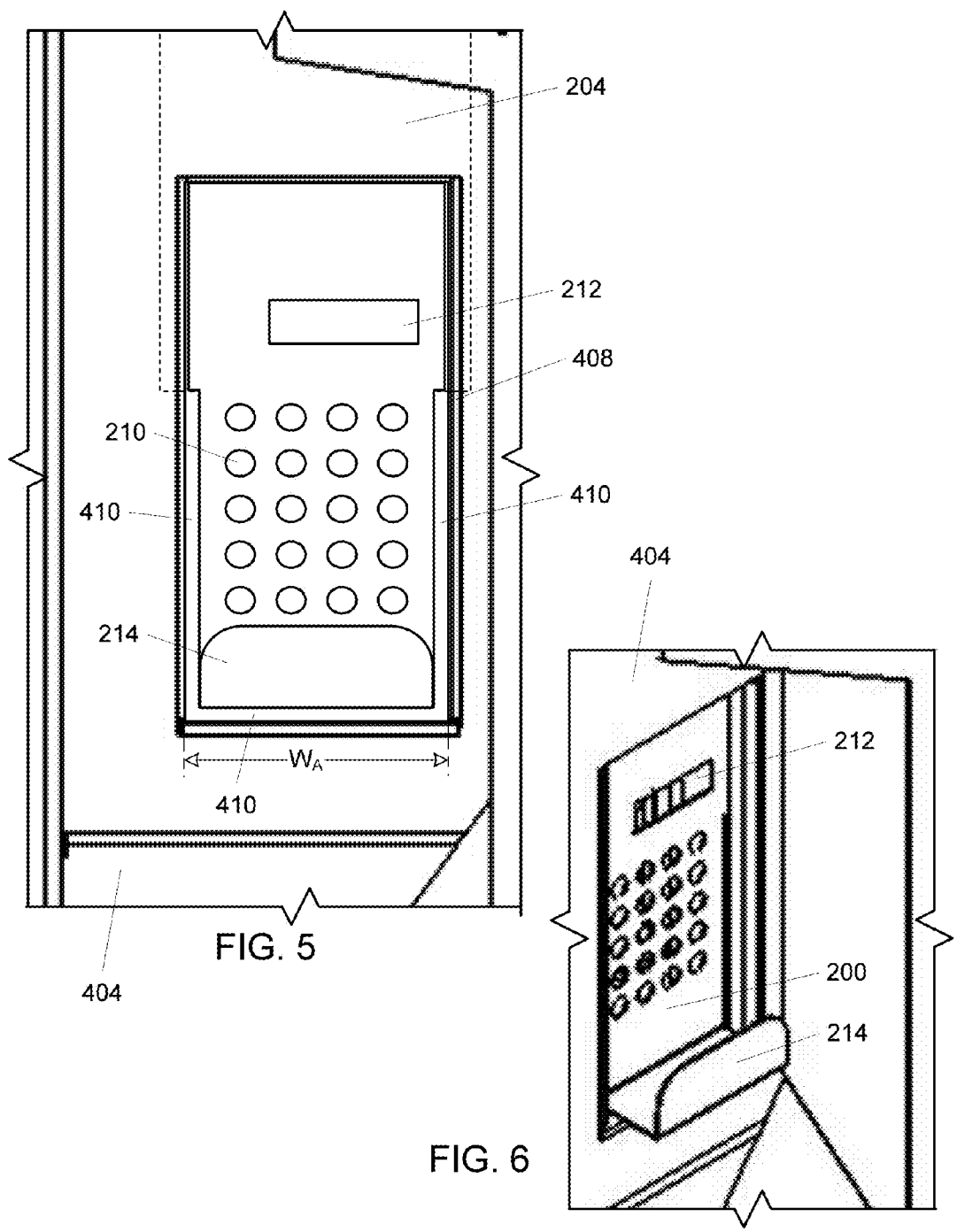
FIG. 5 illustrates, in simplified form, part of the door of FIGS. 4A-4B after the security device has been installed such that its first portion is rigidly constrained behind the door and the second portion is visible within the access opening.
FIG. 6 illustrates, in simplified form, a perspective view of the part of the door shown in FIG. 5.

This disclosure provides a technical solution to address the aforementioned problems inherent with exposed UEPO switches of computer systems.

Our technical solution improves upon current locked door approaches because it does not limit access by placing the UEPO behind the locked door.

Our technical solution also improves upon the non-secure "cover" approach used with exposed UEPO switches because it provides security and a way to identify that the switch has been accessed.

Our technical solution further optionally improves upon the non-secure "cover" approach used with exposed UEPO switches because it facilitates identification of the person who accessed the switch, through capture of epithelial cells from that person so that DNA analysis can be performed.

FIG. 1A illustrates, in simplified form, a perspective view of an example prior art UEPO switch unit 100, typically used on computer systems that have a door that can be locked and unlocked and provide access to computer equipment within the computer system enclosure and also include an access opening that provides access to both the universal emergency power-off switch and system identification information when the door is in a closed position (i.e., the UEPO and system identification information are exposed even if the door to the computer enclosure is closed and locked). As noted above, to prevent inadvertent switching (a.k.a. "throwing") of the switch, a cover 102 is provided as part of the UEPO switch unit 100 that must be moved, for example, by sliding or swinging, out of the way via, for example as shown, a tab 104. As shown in FIG. 1A, the cover 102 is closed, impeding access to the actual UEPO switch (not shown).

The UEPO switch unit 100 also includes a location 106 where system identification information, for example, a system serial number, is visibly present, for example, via a label, tag or plate.

FIG. 1B illustrates, in simplified form, a front view of the example UEPO switch unit 100 of FIG. 1A.

FIG. 1C illustrates, in simplified form, a perspective view of the example prior art UEPO switch unit 100 of FIG. 1A, with the cover 102 opened, with this example, by sliding the tab 104 up to provide access to the actual UEPO switch 108.

FIG. 1D illustrates, in simplified form, a front view of the example UEPO switch unit 100 of FIG. 1C.

FIG. 2 illustrates, in simplified form, one example of a security device 200 for use with a UEPO switch according to the teachings herein.

The security device 200 includes a plate body 202 made up of a first portion 204 and a second portion 206. The first portion 204 has a length ($L_1$) and a width ($W_1$) that are each of a size to allow the first portion 204 to be rigidly constrained on an interior side of a door of a computer enclosure, as will be shown and described in greater detail below.

The second portion 206 also has a length ($L_2$) and a width ($W_2$) that collectively define a surface 208 with multiple openings 210 through it. The openings 210 are present for ventilation purposes but are sized so that an object cannot easily be passed through to manipulate the cover 102 out of the way to access the UEPO switch 108 with the security device 200 in place. Although shown as round holes arranged in a rectangular array in this example implementation, the openings 210 can be square, rectangular, hexagonal, serpentine slot(s), or even part of a screen, and can be arranged in any configuration, the important aspect being their having a size and shape that allows for ventilation while inhibiting manipulation of the cover 102 when in place, not their particular size, shape or arrangement.

In addition, as will shown in greater detail below, the width $W_2$ is such that most of the second portion 206 will substantially, but not entirely, fill the opening in the door that can be used to access the UEPO switch and thus impedes access to the UEPO switch when present.

The second portion 206 also has a port 212 through which the location 106 for the system identification information can be viewed when the security device 200 is constrained in place on the interior of a computer system enclosure's door.

Additionally, the second portion 206 includes a hand grip 214 located at or near the end 218 of the second portion 206. As shown, the hand grip 214 is formed from, and at, the end of the second portion 206, but in other implementations, it could be a separate piece that is affixed to the second portion 206 in a horizontal, vertical or other orientation.

The plate body 202 also has a deformation region 216 such that, if the security device 200 is constrained in place on the interior of a computer system enclosure's door and the door is closed, and the hand grip 214 is moved away from the door in order by an amount sufficient to obtain access to the UEPO switch, the plate body will at least be plastically deformed (and may fracture) within the deformation region 216, thereby providing a clear indication of an attempted access.

In this regard, with many implementations, the plate body 202 will have a uniform thickness and be made of a uniform material such that it will plastically deform (possibly to the extent of being frangible) when a force of less than about 45 Newtons (approx. 10 pounds) but greater than about 11 Newtons (approx. 2.5 lbs) is applied somewhere within an angle range of between 0 degrees and about 45 degrees (+/−a few degrees) off of a perpendicular to the surface 208 (i.e., some one or more angle(s), but not necessarily all angles, within that range should work). As to the approximate force values, it should be understood that they may vary, for example, by 5-10% and are based upon use of aluminum as the material for the plate body. The use of other materials or a non-uniform thickness may result in some variance in those force amounts. For purposes of understanding the potential variance, the important aspect is that the material and thickness will be selected such that, if an average person, grips the hand grip 214 and moves the second portion 206 of the security device 200 enough to obtain access to, and switch, the UEPO switch, it will be readily identifiable through an exceeding of the plastic deformation limit of the plate body 202 within the deformation region 216.

FIG. 3 illustrates, in simplified form, a sectional perspective view of the hand grip 214 portion of the security device 200 of FIG. 2, viewed from the second portion 206 of the plate body 202.

As shown by the cross-hatching in FIG. 3, the interior surface 302 (and optionally the edge 304) of part of the hand grip 214 is textured, for example, by knurling, etching, scoring, grinding, or other mechanical or chemical roughening means, to a degree sufficient to capture and retain epithelial cells from a person who grips the hand grip 214 during the act of gaining access to the UEPO switch behind the second portion 206 of the security device 200. Specifically, the texturing should be sufficient to capture enough epithelial cells to allow for "contact trace DNA" (also referred to as "touch DNA" or "low-level DNA") testing/analysis to be performed, for purposes of assisting with identification of the person who gripped the hand grip 214, and may enhance the person's ability to grip and pull on the hand grip 214 while also not being so rough that it will cause injury to the person (e.g., by cutting through, tearing or excessively abrading the skin).

FIGS. 4A-4B respectively illustrate, in simplified form, a front and rear exploded perspective view of part of a computer system enclosure 402 (shown in ghost lines) having a door 404 with a lock 406, that can be locked and unlocked, and, when open, will provide access to computer equipment within the computer system enclosure 402. As can be seen, the door 404 has an access opening 408 that provides access to a UEPO switch unit 100 and the system identifying information noted above when the door 404 is closed.

As will be understood from FIGS. 4A-4B, first portion 204 of the security device 200 is rigidly constrained behind the door 404 and ahead of the UEPO switch unit 100. Specifically, as shown in FIGS. 4A-4B, the first portion 204 of the security device 200 is sandwiched between the door 404 and a retaining plate 410 that gets bolted to the door 404 ahead of the mounting plate/bezel 412 for the UEPO switch unit 100. In this manner, the first portion 204 of the security device 200 will be immobilized by the door 404, while the second portion 206 will not be.

FIG. 5 illustrates, in simplified form, part of the door 404 of FIGS. 4A-4B after the security device has been installed such that its first portion 204 is rigidly constrained behind the door 404 and the second portion 206 is visible within the access opening 408. As can now be seen, the access opening 408 has a width ($W_A$) such that the width ($W_2$) of at least part of the second portion 206 is less than the width ($W_A$) of the corresponding part of the access opening 408. As a result, there will be a gap 502 between the access opening 408 and the part of the second portion 206 to the hand grip 214 side of the deformation region 216 (FIG. 2) to allow for the hand grip 214 to be grasped and moved, as described above, to gain access to the UEPO switch behind the second portion 206 in an emergency.

FIG. 6 illustrates, in simplified form, a perspective view of the part of the door 404 shown in FIG. 5.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A security device for a universal emergency power-off (UEPO) switch of a computer system enclosure having a door that can be locked and unlocked and provide access to computer equipment within the computer system enclosure, the door having an access opening therein that provides access to the universal emergency power-off switch when the door is in a closed position, the security device comprising:
   a plate body having a first portion and a second portion opposite the first portion,
   i) the first portion having a length and width sufficient to allow it to be rigidly constrained on an interior side of the door adjacent the access opening,
   ii) the second portion having a hand grip near an end of the second portion opposite the first portion, the hand grip including surface texturing sufficient to capture and retain epithelial cells from a person who grips the hand grip during the act of gaining access to the UEPO switch behind the second portion of the security device so that captured epithelial cells will be available for testing or analysis to assist identifying the person who accessed the UEPO switch;
   iii) wherein the width of the second portion is less than a corresponding width of the access opening but sufficiently wide so as to impede access to the UEPO switch when the first portion is rigidly constrained on an interior side of the door and the door is in the closed position; and
   iv) the plate body having a deformation region, of a thickness and material, wherein, when the first portion is rigidly constrained on the interior side of the door adjacent the access opening, application of a force of less than about 45 Newtons to the hand grip, directed within a range from 0° to about 45° from a right angle to the surface in a direction of the first portion, will cause plastic deformation of the plate body within the deformation region.

* * * * *